United States Patent [19]

Rainey

[11] Patent Number: 4,814,583
[45] Date of Patent: Mar. 21, 1989

[54] TEMPERATURE CONTROLLER FOR A WATERBED

[75] Inventor: Jon Rainey, Wellington, New Zealand

[73] Assignee: Safeway (Australasia) Limited, Wellington, New Zealand

[21] Appl. No.: 46,232

[22] Filed: May 1, 1987

[30] Foreign Application Priority Data

May 2, 1986 [NZ] New Zealand .................. 216042
Nov. 12, 1986 [NZ] New Zealand .................. 218281

[51] Int. Cl.⁴ .............................. H65B 1/02
[52] U.S. Cl. ................... 219/494; 219/497; 219/330; 219/496; 5/422
[58] Field of Search .......... 219/212, 490, 494, 497, 219/499, 501, 505, 507–509, 511, 330, 331, 496; 5/421, 422

[56] References Cited

U.S. PATENT DOCUMENTS

| | | | |
|---|---|---|---|
| 2,913,562 | 11/1959 | Weber et al. | 219/496 |
| 2,914,644 | 11/1959 | Holtkamp | 219/496 |
| 3,356,825 | 12/1967 | Mills et al. | 219/212 |
| 3,360,693 | 12/1967 | Fickweiler | 219/212 |
| 3,418,454 | 12/1968 | Ryckman, Jr. | 219/212 |
| 3,462,585 | 8/1969 | Somers | 219/505 |
| 3,559,883 | 2/1971 | Buiting et al. | 219/505 |
| 4,205,223 | 5/1980 | Cole | 219/212 |
| 4,677,281 | 6/1987 | Mills | 219/212 |

Primary Examiner—M. H. Paschall
Attorney, Agent, or Firm—Pasquale A. Razzano

[57] ABSTRACT

A temperature controller for controlling an electrical heater of a bed maintains the bed at a predetermined set temperature and additionally, over a long period of time, acts to vary the set temperature to compensate for variations in the temperature of the ambient environment in which the bed is situated. First and second temperature sensors respectively sense the temperature of the bed and the temperature of the environment ambient to the bed and the heater is switched to regulate the heating of the bed thereby.

11 Claims, 3 Drawing Sheets

TEMPERATURE CONTROLLER FOR A WATERBED

FIELD OF THE INVENTION

This invention comprises a temperature controller for controlling the temperature of a bed such as a waterbed incorporating an electric heater pad, a bed incorporating an electric blanket, or the like. The invention will be described primarily with reference to waterbeds but it will be appreciated that it is applicable to other beds and where appropriate the term 'waterbed' is to be construed accordingly herein.

BACKGROUND OF THE INVENTION

A waterbed includes an electrical heating element or pad which is arranged to heat the bed and in particular the water mattress thereof and to maintain the bed at a predetermined or "set" temperature. The heating element is controlled by a thermostat controller or control unit which comprises a temperature sensor arranged to sense the temperature of the bed. The controller effects switching on and off of the heating element to maintain the bed at this predetermined set temperature.

Experience shows that the optimum set temperature comfort-wise is not the same for all temperatures of the ambient environment external to the bed, in the bedroom. In wintertime, for example, when the temperature of the bedroom environment is reduced, users often wish to increase the "set" bed temperature slightly, to achieve maximum comfort, to overcome inter alia the increased heat loss from a top of the bed. In summertime, when the temperature of the bedroom environment is increased, users often wish to reduce the set temperature of the bed by a degree or two to create a comfortable cooling effect. It has been found that a typical median "set" temperature for a waterbed is between 25° and 35° Celsius. Userse typically like this set temperature to be increased or decreased by something of up to the order of two degrees for corresponding alterations over an environmental temperature range of between about 0° to 40° C.

OBJECTS AND SUMMARY OF THE INVENTION

This invention provides an improved or at least alternative form of temperature controller for a waterbed or other electrically heated bed.

In broad terms the invention may be said to comprise a temperature controller for controlling an electrical heater of a bed, comprising:

first temperature sensing means to indicate the temperature of said bed, second temperature sensing means to indicate the temperature of the environment ambient to said bed, and means for switching said heater to regulate the heating of said bed thereby, arranged to actuate said heater to maintain said bed at a predetermined set bed temperature and to vary same to compensate for variations in the temperature of said environment ambient to said bed.

Typically the switching means comprises an electrical switch, for example a micro-switch or relay, and actuating means for said switch under the influence of said first and second temperature sensing means.

In one form of the invention the temperature sensing means may be thermistors or other temperature sensitive electrical devices suitably arranged to vary or generate an electrical current or voltage in proportion with sensed changes in temperature. The actuating means for the heater micro-switch or relay comprises an electrical circuit arranged to provide an electrical output to the micro- or relay switch in accordance with an input or inputs to the actuating circuit from said temperature sensitive devices. The actuating means circuit may comprise a suitably configured electrical comparator, for example.

In another form of the invention the temperature sensing means may comprise bulb-and-capillary arrangements connected to the heater switching means and actuating means thereof. The respective bulb-and-capillary arrangements may be connected in series whereby expansion/contraction of the fluid in each bulb-and-capillary arrangement is cumulative, and the bulb volume of each arrangement is predetermined whereby the series arrangements provide a combined first and second temperature sensing means indication.

One preferred embodiment of each of the two mentioned forms of the invention are illustrated in the accompanying drawings, by way of example, in which:

DETAILED DESCRIPTION OF THE PREFERRED EMBODIMENTS

Figure 1:
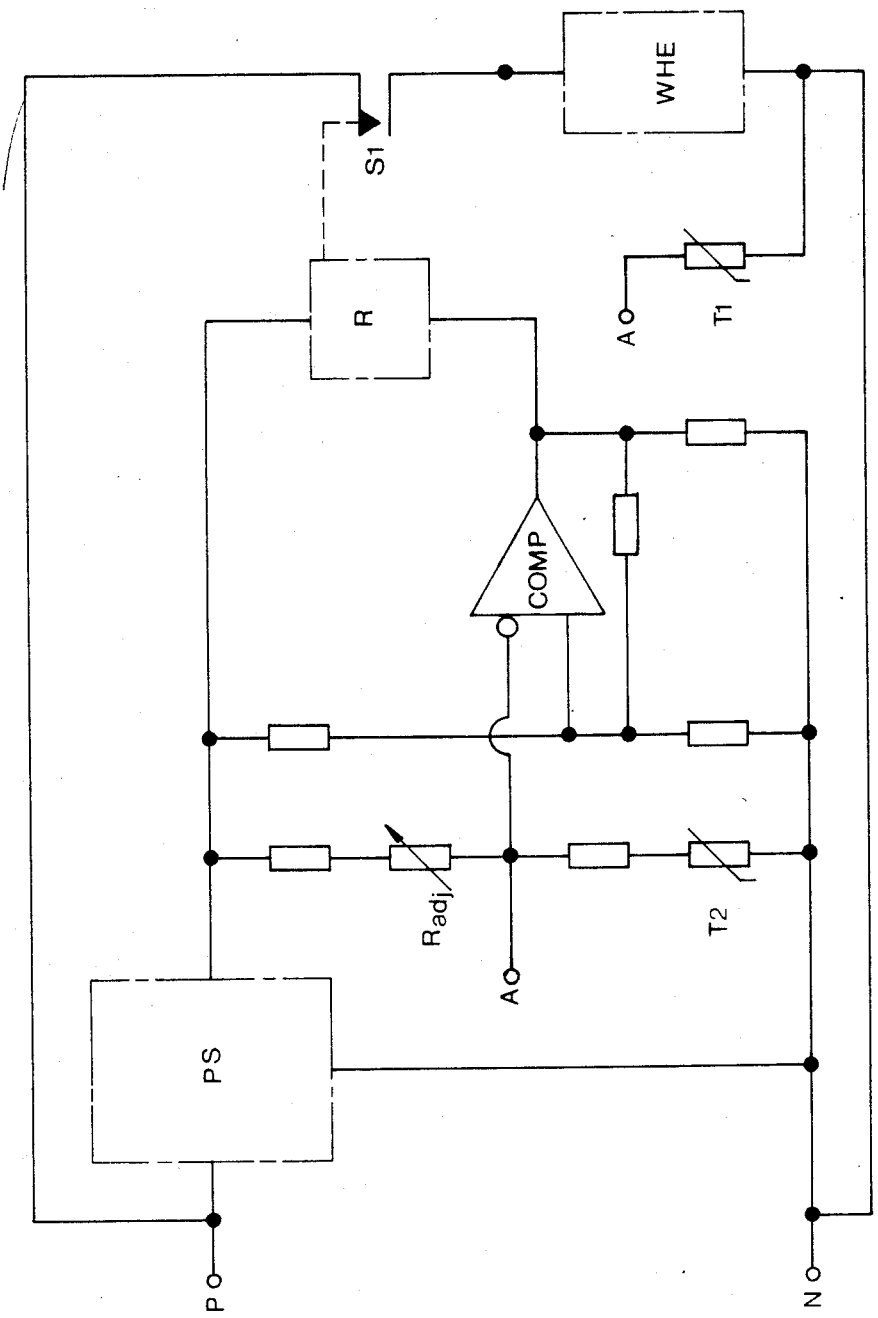
FIG. 1 illustrates the electrical circuit of the preferred embodiment of the first form of the invention, FIG. 2 schematically illustrates the operation of the preferred embodiment of the second form of the invention.
Figure 2:
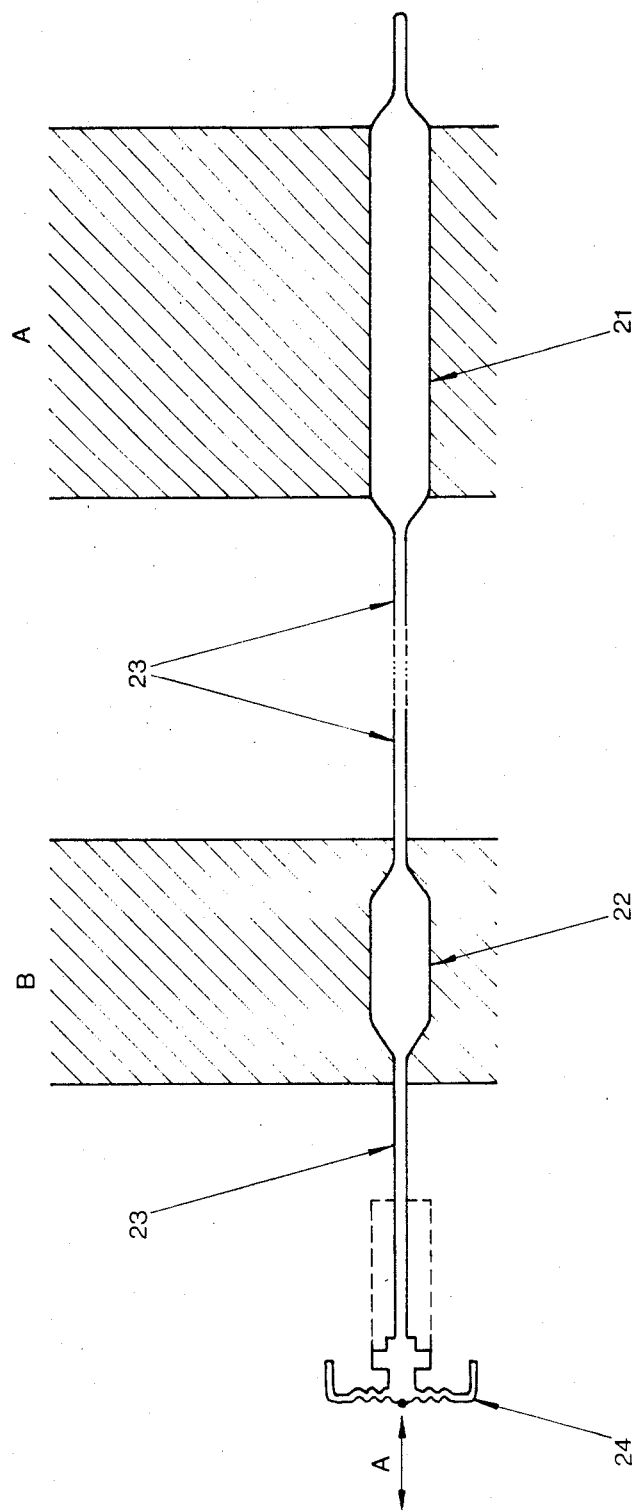

In the FIG. 1 circuit of the first preferred embodiment temperature controller a waterbed heating element indicated at WHE in the drawings, of a bed with which the controller is associated, is connected between phase and neutral power lines P and N, through switch contacts S1 of relay R. Relay R forms an electrical switch for the heater element, with switching of the waterbed heater WHE on and off being effected by the contacts thereof.

The temperature sensing means for indicating the temperature of the bed comprises a temperature sensitive electrical device and specifically thermistor T1, which in the preferred form has a negative temperature co-efficient with the controller circuit being arranged accordingly as will be apparent, but other suitable devices may be employed. The second temperature sensing means for indicating the temperature of the environment ambient to the bed comprises thermistor T2, which also has a negative temperature co-efficient. The bed temperature thermistor T1 and ambient environment temperature thermistor T2 are connected to an actuating means for the relay R comprising an electrical circuit arranged to provide an electrical output to the relay to operate same as will be described. Any suitable arrangement of circuit may be employed, and in the preferred embodiment illustrated an operational amplifier configured as a comparator COMP is used. Thermistors T1 and T2 are connected, in parallel as shown, to the inverting input of comparator COMP, and the other input to the comparator COMP is set at a fixed level.

The circuit arrangement is such that an increase in ambient environment temperature, for example, will result in a decrease in the resistance of thermistor T2, which alters the circuit balance and voltage at the inverting input to COMP causing the output thereof to go low for a given bed temperature at thermistor T1, switching relay R to allow the bed to cool, or, alternatively, requiring a greater drop in temperature at thermistor T1 for COMP to drive relay R to switch the bed heater WHE on and vice versa. Initial determination or subsequent external manual adjustment of the bed set temperature may be effected by adjustment of variable resistance Radj in the circuit of the thermistor T2.

In the preferred form of controller described a power supply for the controller circuit is provided by a capacitive charge pump power supply indicated at PS.

It will be appreciated that in operation of the controller described the same will act to maintain the bed at a proportionately increased set bed temperature with a relative decrease in the temperature of the environment ambient to the bed, and vice versa, in accordance with the invention.

The sensing thermistor T2 may be positioned in the controller housing for example, when it is preferred that a relay such as relay R1 is employed as the waterbed heater switch. Many solid state waterbed controllers employ a Triac to switch the heater load which when conducting the water heater load will typically dissipate of the order of three watts, thus heating the controller circuit environment. The use of a relay avoids the difficulty of heat dissipation affecting the thermistor T2 when same is located nearby.

In the second form of controller, illustrated in FIGS. 2 to 5, each of the first and second temperature sensing means comprises a temperature sensitive fluid containing bulb-and-capillary arrangement. Bulb-and-capillary arrangements are per se known in the art. The expansion and contraction of a liquid such as a suitable alcohol or the like within the bulb is transmitted into mechanical movement along the capillary, typically to a small mechanical bellows diaphragm or the like. In the second form of the invention a bed temperature sensing bulb is suitably located to sense the bed temperature and an ambient environment temperature sensing bulb is located to sense the bedroom temperature. The first and second bulb-and-capillary arrangements are operatively connected to the actuating means for the heater switch.

In the preferred embodiment of the second form of the invention the bulb-and-capillary arrangements are connected in series whereby expansion/contraction of the fluid in each bulb is cumulative, and each bulb is of a predetermined volume, whereby the series arrangement provides a combined first and second temperature sensing means indication to the heater switch actuator. A second bulb 22 is connected in series with a first bulb 21 and the arrangement is operatively connected to a small bellows diaphragm 24 which transmits expansion and contraction of the bulb fluids and movement of liquid alog the capillary 23 into mechanical movement of the bellows as indicated by arrow A in FIG. 2. The first bulb 21, of volume X, is located at the end of the capillary 23 and is in use placed under the bed mattress, shown schematically in FIG. 2 as medium A. As the temperature of medium A varies, the expansion or contraction produced will create a movement in the bellows diaphragm 24 proportional to the volume of liquid in the bulb 21. The second bulb 22, of reduced volume X/Y, is located between the first bulb 21 and the bellows diaphragm 24 and is in use placed in contact with air at ambient temperature in the bedroom for example, shown as medium B. As the temperature of medium B varies the expansion of contraction produced in the bulb 22 will also create a movement in the bellows 24 proportional to the volume of liquid in the bulb 22. In use the two bulbs will in effect control the switch (as will be described) actuated by the bellows diaphragm 24 such that the 'set' temperature of the bed is varied in accordance with variations in the temperature of the ambient air, as previously referred to. As the ambient environment temperature rises and falls the bulb 22 will tend to compensate for same and lower and raise, respectively, the set temperature by altering correspondingly the movement of the bellows 24. The relative movement of the bellows 24 can be altered by altering the relative volumes of the bulbs 21 and 22. The volume of bulb 22 can for example be made smaller or larger than that of bulb 21.

If the volume of bulb 21 in medium A is for example 10 units and the volume of bulb 22 in medium B is 1 unit then medium A would have to change by 10° C. to affect the bellows to the same extent as a 1° C. change in medium B. The Y referred to in the volume of bulb 22 can be called the 'ratio' between the two temperature effects, in the example given this being 1:10. If the set point is intended to be 30° C. when the air temperature is 15° C. a drop in the air temperature by a 10° C. to 5° C. will result in an increase in the set point to 31° C. Similarly, an increase in the air temperature by 10° C. to 25° C. will result in a lowering of the set point by 1° C. to 29° C.

Figure 4:
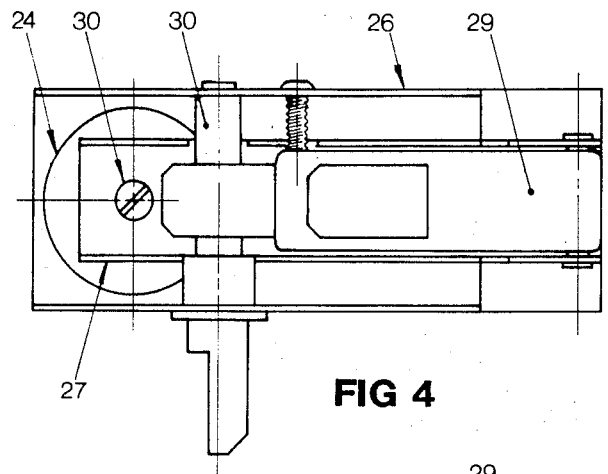
FIGS. 3, 4 and 5 are, respectively, side cross-sectional, plan, and end views of the temperature sensing means and switching means of the second preferred embodiment of the invention.
Figure 5:
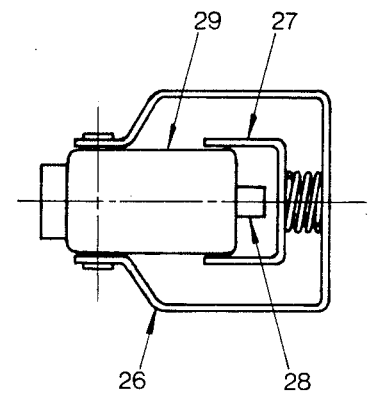
Figure 3:
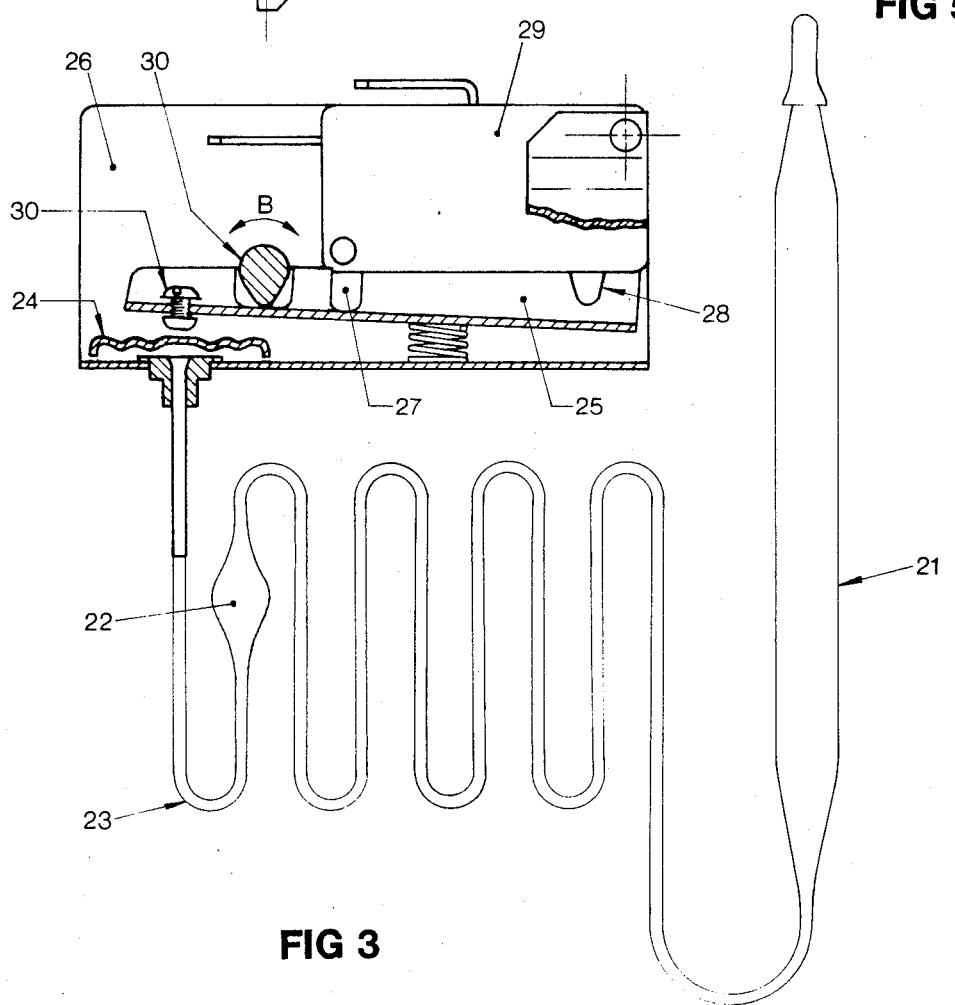

In the second preferred embodiment of the invention, as illustrated in FIGS. 3, 4, and 5 the bellows diaphragm 24 activates a micro-switch 29 which switches (directly or indirectly) the waterbed heating element. A rocker 25 mounted within a frame work 26 for movement about a pivot point 27 contacts at part thereof the operative button 28 of the micro switch 29, which is also mounted to the frame 26, and at another part the bellows 24. As the bellows rises and falls the rocker 25 will move about the pivot point 27 and operate the microswitch. An adjustment screw 30 is provided in the bellows contacting end of the rocker. A mechanical cam 30 which contacts an intermediate portion of the rocker on the bellows side thereof is rotatable as indicated by arrows B, to adjust the set point of the controller manually, at initial determination of the bed set point for example.

The foregoing describes the invention including preferred forms and embodiments thereof. It will be appreciated that various other specific arrangements of circuits and controllers in accordance with the principles invention are possible and those described herein are given by way of example only, to assist understanding of the invention, and are not to be taken as limiting on the scope thereof.

I claim:

1. A temperature controller for controlling an electrical heater of a waterbed, comprising:
    first temperature sensing means to indicate the temperature of the water mattress of the waterbed,
    second temperature sensing means to indicate the temperature of the environment ambient to said waterbed, and
    means for switching said heater to regulate the heating of said waterbed thereby, arranged to:

actuate said heater to maintain said waterbed mattress at a predetermined set bed temperature, and vary said set bed temperature to compensate for variations in the temperature of said environment ambient to said waterbed to increase said set temperature in response to a decrease in the temperature of said environment and to decrease said set temperature in response to an increase in the temperature of said environment, the degree of said increase and/or decrease being so proportionate to the decrease or increase of the ambient environment temperature that the temperature of said water mattress is varied to compensate for variations in the temperature of said environment by such amounts that said mattress is maintained at an optimum temperature for occupants of the bed.

2. A temperature controller as claimed in claim 1, wherein said switching means comprises an electrical switch and actuating means for said switch under the influence of said first and second temperature sensing means.

3. A temperature controller as claimed in claim 2, wherein each of said temperature sensing means comprises a temperature sensitive fluid-containing bulb-and-capillary arrangement connected to said actuating means.

4. A temperature controller as claimed in claim 3, wherein said bulb-and-capillary arrangements of said first and second temperature sensing means are connected in series with one another to said actuating means whereby expansion/contraction of said fluid in each said bulb-and-capillary arrangement is cumulative and wherein each of said bulb-and-capillary arrangements is of a predetermined volume whereby said series arrangements provide a combined first and second temperature sensing means indication.

5. A temperature controller as claimed in claim 4, wherein said electrical switch is an electro-mechanical micro-switch and wherein said actuating means comprises mechanical connecting means by which said series bulb-and-capillary arrangements are operatively connected directly or indirectly to said micro-switch.

6. A temperature controller as claimed in claim 5, wherein said micro-switch is operatively connected to said series bulb-and-capillary arrangements through a bellows diaphragm, operatively connected by said bulb-and-capillary arrangements, and a mechanical rocker in contact at one part thereof with said bellows diaphragm and mounted for movement under the influence of same and bearing at another part thereof on said micro-switch.

7. A temperature controller as claimed in claim 6, wherein initial determination of said bed set temperature is effectable by adjustment of a mechanical cam bearing upon said rocker to adjust the initial relative position thereof.

8. A temperature controller as claimed in claim 7, including a component supporting frame comprising opposing side walls and wherein said rocker is mounted to extend in said frame longitudinally between said side walls and wherein said micro-switch and said bellows diaphragm are mounted to said frame such that said rocker contacts same as aforesaid.

9. A temperature controller as claimed in claim 2, wherein each of said temperature sensing means comprises a temperature sensitive electrical device and wherein said actuating means comprises an electrical circuit arranged to provide an electrical output to said switch or to an electrical driver circuit for said switch whereby to operate same in accordance with an input or inputs to said circuit from said temperature sensitive devices.

10. A temperature controller as claimed in claim 9, wherein said actuating means circuit comprises an electrical comparator and said temperature sensitive devices comprise thermistors and wherein said comparator has an output arranged to drive said switch and an input or inputs arranged to receive and compare electrical currents or voltages through or across each of said thermistors or associated circuits of same, together or to a predetermined reference current or voltage.

11. A temperature controller as claimed in claim 10, wherein initial determination of said bed set temperature is effectable by adjustment of a variable resistance in the thermistor circuit of said second temperature sensing means.

* * * * *